E. E. HOLT.
PNEUMATIC VALVE.
APPLICATION FILED JUNE 5, 1917.

1,271,898.

Patented July 9, 1918.

Inventor:
Edward E. Holt.

Witness:

UNITED STATES PATENT OFFICE.

EDWARD E. HOLT, OF CHICAGO, ILLINOIS, ASSIGNOR TO HOLT AUTO DEVICES COMPANY, OF CHICAGO, ILLINOIS, A CORPORATION OF ILLINOIS.

PNEUMATIC VALVE.

1,271,898.    Specification of Letters Patent.    Patented July 9, 1918.

Application filed June 5, 1917.   Serial No. 173,028.

*To all whom it may concern:*

Be it known that I, EDWARD E. HOLT, a citizen of the United States, residing at Chicago, county of Cook, and State of Illinois, have invented certain new and useful Improvements in Pneumatic Valves, of which the following is a specification.

The present invention has to do with certain improvements in air valves, and has particular reference to the construction of tire valves for use on pneumatic tires, but certain features of the invention will be found to be of value for use in air valves for other classes of service. As a matter of convenience, and because the features of the invention are very well adapted for use on tire valves, I have shown the features as being applied to a tire valve, and will so claim the features in certain of the claims.

In order for a valve for this service to find favor, it must be of very simple construction, so that it can be manufactured from a minimum number of parts of simple form, and which can be readily assembled. It must also be constructed so that it will provide a very efficient seal against the leakage of air under high pressure, and it must also be of such form that this efficient seal will be maintained at all times. Furthermore the valve should be so constructed that there will be no loss of air during the process of inflation, and during the process of making and opening the connections from the pump to the valve.

The use of springs and the like in connection with movable portions of pneumatic valves is very undesirable, not only from the standpoint of manufacture, but also from the standpoint of certainty of operation at all times after the parts have been assembled. Furthermore, the use of gaskets or washers or the like at the sealing surfaces, is also very undesirable. On the contrary, a metallic seal, if properly formed and assembled, will very thoroughly and efficiently insure against any loss of air by leakage or seepage. Experience has shown that where a metal to metal valve seating is used there is great difficulty in providing a sufficiently perfect seat to insure perfectly against any loss of air. In fact even where a conical valve is used, in combination with a conical valve seat, it is necessary to very accurately grind both the valve and the seat in order to insure a perfectly airtight closure.

One of the objects of the invention is to provide a tire valve which shall embody the desirable features hereinbefore referred to, not only from a standpoint of manufacture, but also from a standpoint of subsequent operation. Another object is to provide a conical valve of such construction that, when forced into its seat, it will yield slightly or sufficiently to insure a perfect closure so as to insure a perfectly air-tight joint.

Other objects and uses will appear from a detailed description of the invention which consists in the features of construction and combinations of parts hereinafter described and claimed.

Referring to the drawings.

Figure 1:
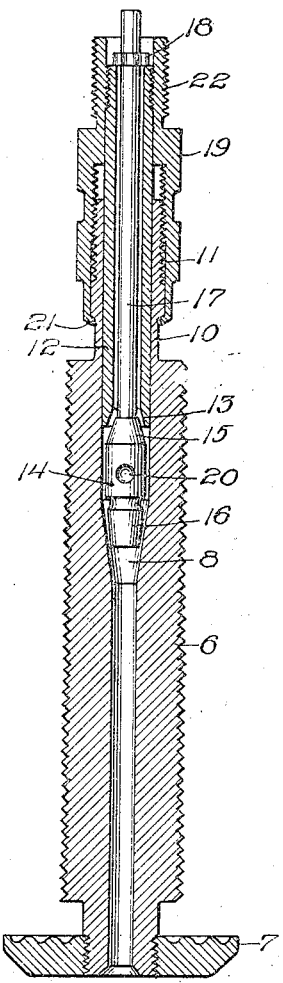
Figure 1 shows a longitudinal section through the assembled valve, the plunger and actuating sleeve being in raised position for inflation.

In the several figures I have shown the features of my invention as being applied to a valve having a threaded stem 6 with a grooved flange 7. This grooved flange seats against the inner surface of the tube, and a lock nut or the like may be threaded down along the stem 6 so as to engage the outer surface of the tube in the usual manner. Furthermore, the stem 6 may be extended up through the felly of the wheel in the customary manner. If desired, a valve cap of suitable form may be secured onto the threaded stem, although this is a matter of convenience in any particular case and does not form any feature of the present invention.

At a suitable point within the bore of the stem 6 I provide an upwardly facing conical valve seat 8. The upper portion 10 of the stem 6 is shown as being of reduced size and provided on its upper end with threads 11. Within the upper portion of the stem is slidably mounted a tubular member 12, the lower end of which is provided with a downwardly facing conical valve seat 13. The valve member 14 operates within the stem 6 between the seats 8 and 13. The upper portion 15 of this valve member is of conical formation and adapted to engage the valve seat 13 while the lower end 16 of the valve member 14 is also of conical formation and adapted to engage the valve seat 8. This valve member, therefore, is shown as comprising a pair of oppositely faced truncated cones.

The valve member 14 is connected to the lower end of the valve stem 17. The upper end of the valve stem carries an enlargement 18 of any suitable form, which enlargement is adapted to engage the upper end of the tubular member 12 at certain times. The valve stem 17 is of smaller size than the bore of the tubular member 12, and the enlargement 18 is of suitable form to permit air to pass by and down alongside of the valve stem.

Figure 5:
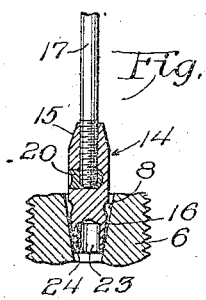
Fig. 5 shows a fragmentary detail of the lower end of the plunger and the valve seat, the valve block being shown in cross-section.
Figure 4:
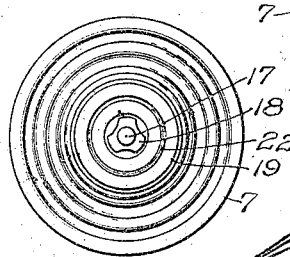
Fig. 4 shows a plan view corresponding to Figs. 1 and 2.

The upper end of the tubular member 12 is connected to an actuating sleeve 19, which actuating sleeve engages the threads 11 of the extension 10 of the stem 6. Consequently, by turning the actuating sleeve, the tubular member 12 will be raised or lowered with respect to the stem 6. A convenient formation is that illustrated in the drawings, in which the upper end of the tubular member 12 is threaded into the actuating sleeve 19. A convenient form of attachment of the valve member 14 to the valve stem 17 is that shown in detail in Fig. 5. As shown in said figure, the valve member is threaded onto the lower end of the valve stem. In order to insure a permanent threaded connection, the valve member may be provided with a socket 20 communicating with the threads on the inner end of the valve stem, so that upon pouring a drop of lead or solder or the like into said pocket, the parts will be permanently locked together.

Figure 2:
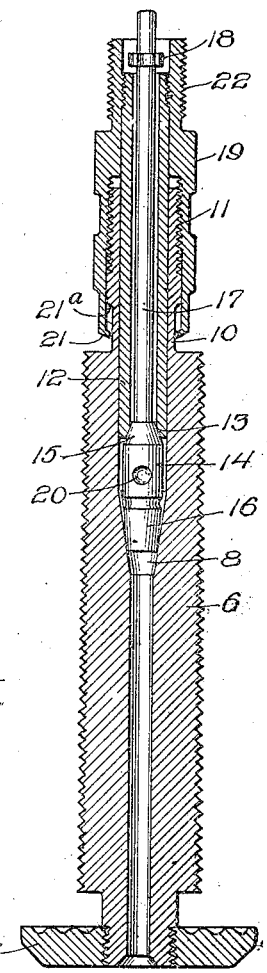
Fig. 2 shows a view corresponding to Fig. 1, the plunger and actuating sleeve being lowered into the sealing position.

Examination of Figs. 1 and 2 in particular will reveal the presence of an inturned flange or bead 21 on the lower end of the actuating sleeve 19. This flange will serve to limit the upward movement of the actuating sleeve, so that after the parts have been assembled, said sleeve cannot be removed from the upper end of the stem 6. The upper portion of the valve stem 6 has the downwardly facing shoulder 21ª against which the flange or bead 21 seats, and the flange 21 is so formed with respect to the shoulder 21ª that, when the upward movement of the flange is limited, as shown in Fig. 1, an air-tight connection is effected at this point. Consequently, the flange 21 serves not only to limit the upward movement of the sleeve 19, but also serves to insure an air-tight connection when the sleeve is fully raised.

Figure 3:
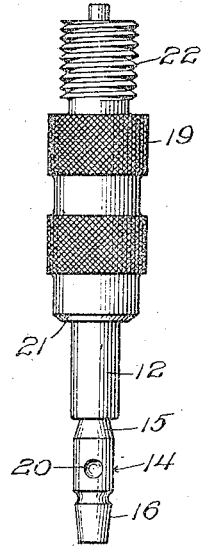
Fig. 3 shows in elevation the plunger and actuating sleeve as removed from the body portion of the valve.

The parts may be conveniently assembled in the following manner: The tubular member 12 is threaded into the actuating sleeve 19. Thereupon the valve stem 17 is set into position through the tubular member, the valve member 14 is threaded onto the lower end of the stem, and permanently secured in the manner just described. Upon the completion of these operations, these parts will assume the condition shown in Fig. 3. It is to be observed that the distance between the valve member 14 and the enlargement 18 is sufficient to permit a desired amount of up and down movement of the valve member and the valve stem with respect to the valve seat 13. This amount of movement will be desired during the process of inflating the tire.

Having assembled the parts to the point thus far described, the tubular member 12 is set down into the upper end of the stem 6, and then the actuating sleeve 19 is threaded down along said actuating stem. Finally, the lower end of the actuating sleeve is beaded in, as shown at 21, so that thereafter the actuating sleeve cannot be removed.

Upon threading the actuating sleeve downwardly the maximum distance, as shown in Fig. 2, the lower end 16 of the valve member 14 will be forced firmly into the conical valve seat 8. At the same time, the upper end 15 of the valve member will be forced firmly into engagement with the conical valve seat 13. Thus there will be formed a very perfect primary air seal by the lower end 16 of the valve, and also a very perfect secondary air seal by the upper end 15 of the valve.

Upon threading the actuating sleeve 19 upwardly the distance between the valve seats 13 and 8 will be increased, so that one or the other or both of the ends of the valve member 14 will be disengaged from the corresponding valve seat. If the tire be under pressure at the time the actuating sleeve is thus unthreaded to raise the tubular member, the valve member 14 will be held in engagement with the valve seat 13, so that any leakage of air will be prevented during this raising operation. Thereupon an air-tube or the like may be connected to the threaded upper end 22 of the actuating sleeve for the purpose of inflating the tire.

During the inflating operation, the valve member will be forced downwardly away from the seat 13. If the amount of this downward movement be sufficient, then the lower end 16 of the valve member will seat against the valve seat 8 and thus prevent any further inflation. However, by limiting the downward movement of the valve stem, assurance will be had that such reseating will not occur. The upward movement of the actuating sleeve 19 will be limited by the bead 21, and the downward movement of the valve stem will not be resisted until the enlargement 18 engages the upper end of the tubular member 12. By properly proportioning the parts, assurance will be had that upon threading the actuating sleeve 19 upwardly the maximum distance, the enlargement 18 will be engaged by the upper end of the tubular member 12 before any reseating will occur. Upon having completed the inflating operation, the actuating sleeve must be threaded down so as to firmly seal both ends of the valve member against their respective valve seats.

I have previously mentioned that, when a metal to metal valve seating is used, it will generally be difficult to secure a perfectly air-tight seating unless the valve and seat be very accurately ground. However, by the use of the features which I will now explain, a perfectly air-tight seal can be obtained even when the parts are not accurately ground. For this purpose, I so form the seating portion of the valve member that the same will have a certain amount of resiliency, thus making it possible for the valve to accommodate itself to any irregularities between the contours of the valve and seat when the parts are forced together. In the arrangement illustrated, I provide a socket or recess 23 in the lower portion of the valve member 14, so that the lower edge 24 of said valve member is relatively thin, and, consequently, has a certain amount of resiliency or ability to adjust itself under pressure to inequalities of contour. I then form the valve seat 8 on a different angle from the valve portion 16, generally a larger angle, so that, when the valve member is wedged home, its lower edge 24 will first come into and will remain in engagement with the valve seat 8, thus considerably limiting the area of contact to the extreme lower portion of the valve member, which lower portion possesses the resiliency previously explained, because of the presence of the socket or recess 23. Consequently, when the valve member 14 is forced home an extremely air-tight and perfect connection is insured. I wish to point out the fact that this latter feature having to do with the air-tight seating of the valve against its valve seat may be used with equal advantage, or at any rate with great advantage in many other locations than in tire valves. Consequently, I do not limit the use of this feature to tire valves, except as I may do so in the claims.

This application, as to certain features herein disclosed, is a continuation of my copending application, Serial No. 133,734, which was filed November 27, 1916, and allowed March 22, 1917.

While I have herein shown and described only a single embodiment of the features of my invention, still it will be understood that I am not limited to this embodiment except as I may limit myself in the claims.

I claim:

1. In a pneumatic valve, the combination of a conical valve plug and a conical valve seat therefor, both of circular cross section, the taper of the cone of the valve being less than the taper of the cone of the valve seat whereby when the conical plug is forced into the conical valve seat contact first takes place on the lower edge of the conical plug, there being a recess or socket of uniform diameter in the lower end of the valve plug to thereby provide a thin circular wall in the lower portion of the valve plug, said wall increasing in thickness from its contacting edge upwardly toward the body of the plug for the purpose specified, and means for forcing the plug into the valve seat, substantially as described.

2. In a pneumatic valve, the combination of a conical valve seat and a conical valve plug therefor, both of circular cross section, the taper of the cone of the plug being less than the taper of the cone of the valve seat, whereby contact is first established between the extreme edge of the plug and the surface of the valve seat, and there being a recess or socket in the contacting end of the valve plug to thereby provide a thin circular wall in the valve plug, said wall increasing in thickness from the extreme contacting edge toward the body of the plug to thereby insure a maximum flexibility in the extreme contacting portion of the wall for the purpose specified.

EDWARD E. HOLT.